May 25, 1971  L. A. KOLL ET AL  3,579,672

METHOD AND APPARATUS FOR MOVING OBJECTS

Filed Feb. 5, 1970  7 Sheets-Sheet 5

INVENTORS
LAUREL A. KOLL
WALTER CROOK, JR.

BY Cushman, Darby & Cushman
ATTORNEYS

3,579,672
METHOD AND APPARATUS FOR MOVING
OBJECTS
Laurel A. Koll and Walter Crook, Jr., Ruleville, Miss.,
assignors to Diamondhead Properties, Inc.
Continuation-in-part of application Ser. No. 706,755,
Feb. 14, 1968. This application Feb. 5, 1970, Ser.
No. 9,029
Int. Cl. A61g 7/08, 7/10
U.S. Cl. 5—81
28 Claims

ABSTRACT OF THE DISCLOSURE

An improved transporter device includes a pair of superposed aprons formed as endless belts or portions thereof and which function to receive, carry, or deposit objects in accordance with desired transferring and carrying requirements. Each of the aprons is supported by a non-rigid support means which maintains supporting surfaces of the pair of aprons in substantially horizontal planes of operation for transferring objects from one horizontal surface to a surface provided on the transporter device itself. Transferring movements of the two aprons can be carried out by controlled translating movements of the supporting means contained within the two belts, and the lower apron or belt includes a section which is fixed relative to a base portion of the transporter device so that the lower apron does not have to be driven. In addition, the upper apron defining belt can be alternatively driven or not driven relative to its support means in accordance with loading, unloading, or positioning functions that may be desired. The non-rigid support means are made up of a number of flexible fingers so that the apron can conform to irregularly shaped objects, such as a patient being moved onto or from a hospital bed, so that the weight of the object is transferred downwardly through the aprons and their associated support means to an area of surface directly beneath the object when the object is supported by the apron. Control means are provided for controlling cycles of loading, unloading and positioning with the transporter device, and the device offers a variety of functions and methods of use.

This invention is related to the subject matter of our copending application Ser. No. 706,755, filed Feb. 14, 1968 (issued as U.S. Pat. 3,493,979 on Feb. 10, 1970). The present specification represents, in part, a continuation of subject matter in our aforesaid application.

BACKGROUND AND BRIEF DESCRIPTION OF INVENTION

This invention pertains to improved apparatus, and methods for use, for moving objects from one surface area to another. The invention has particular utility in offering a safe and reliable transporter device for transferring non-ambulatory patients from one location to another without requiring any manual exertion, but the invention is equally useful for moving other articles and objects from one place to another.

As discussed in our aforesaid patent, prior methods for handling patients in hospitals and nursing homes have required manual lifting of the patient to accomplish a movement of the patient from a bed to another surface or whatever. Not only has this type of manual effort resulted in unnecessary injury to and strain on attendants, it also fails to treat patients in a gentle and acceptable way which will not aggravate certain types of injuries or conditions. Even the necessary but simple requirement of changing bedding has required considerable manual effort on the part of attendants and unnecessary exertion of a patient to accomplish the task. As also pointed out in our previous patent, attempts have been made to replace manual handling of patients with various devices which utilize straps, belts, or stretchers, to assist in required handling and movement of patients. Our previous patent was directed to an improved apparatus and method for handling patients with the least amount of discomfort to the patient and with no manual exertion required on the part of attendants. The apparatus employed a pair of endless belts, one positioned above the other, so as to avoid any abrasive wedging or lifting of a patient when inserting the endless belts beneath his body in a bed or other surface. A full description of the apparatus, its functions, and methods of its use are set forth in the aforesaid patent and the descriptions of that patent are incorporated herein by reference for purposes of providing background information on the state of the art of the present invention.

The apparatus of the present invention is comparable to the apparatus described in our aforesaid patent application to the extent that preferred embodiments of both types of apparatus utilize superposed aprons in the form of endless belts to carefully load or unload an object onto or off from an upper apron surface. However, the apparatus of the present invention, and its method of use, differs from the apparatus of our previous invention in many ways and offers certain improvements over the previous arrangements. This is not to say that the previous arrangement is not useful, but rather, we intend to point out that there is a difference between the two arrangements and these differences result in each arrangement having utility in certain uses and requirements.

The apparatus of the present invention contrasts with our previous invention by a new arrangement of upper and lower aprons that eliminates any requirement for positively driving either of the aprons for effecting loading and unloading operations. In fact, the lower apron or endless belt of the present invention includes a section which is permanently secured in a fixed position relative to a base portion of the transporter device, and translating movements of both upper and lower aprons are carried out by horizontal movements of upper and lower support means associated with the two endless belts forming the aprons. The upper apron is of a dimension and configuration to provide a supporting surface over the transporter device at all times, even when the upper apron is extended to its outermost lateral position relative to the base of the device, and thus, there is no gap left behind on the transporter device when the belts are loading or unloading an object relative to an adjoining surface. Also, an improved, non-rigid support means is provided for each apron, and the non-rigid support means is formed preferably with a plurality of finger elements extending towards the intended leading edge of the apron within which the support means is fully contained.

In accordance with the present invention, upper and lower aprons are moved in horizontal planes by a driving means which is operatively connected to the upper and lower support means contained within the two apron defining endless belts. This eliminates any positive driving, and a need for synchronization, of the belts themselves since the endless belts will move automatically in response to translating movements of the two support means associated with them. Thus, tensioning and tracking of the endless belt defining each apron becomes less critical than with the arrangement discussed in our prior application. The driving and control systems of the present invention are easily operated to effect reliable loading, unloading and positioning movements of an object relative to the uppermost surface of the two aprons. Furthermore, the endless belts defining the aprons of the present invention can be manufactured from or coated with a material having a low coefficient of friction since there is no requirement for frictional contact between the belts themselves and adjoining surfaces which are contacted by the belts. Although the prior arrangement provided for non-rigid support means for endless belts, the present invention provides for greater flexibility and conforming of the aprons to the shape of an object by a provision for a novel flexible support means structure and by a lesser requirement for a tight tensioning of the belts establishing the aprons relative to the support means structure.

In its basic form, the transporter device of the present invention includes flexible support means capable of translatory movement between a retracted position on the base structure of the device and an extended position over a bed to or from which an article or patient is to be transferred, the aprons functioning to insulate the support from lateral forces, such as those resulting from sliding friction, during loading and unloading operations and to maintain a load on the support during loaded translating movement thereof. In a preferred embodiment, the invention includes upper and lower aprons defined by endless belts or portions thereof and superposed one above the other to provide for a horizontally disposed upper surface which can receive and carry objects on the transporter device. Upper and lower support means are associated respectively with the upper and lower aprons and function to maintain the aprons in substantially flat, thin planes while still permitting a desired degree of flexibility and shaping of the supporting surfaces of the aprons. In addition, a driving means is provided for translating the two support means in horizontal planes of movement which cause the aprons to extend outwardly away from or backwardly towards a base portion of the transporter device. The lower apron is established by an endless belt including a section which is fixed in its position relative to the base portion of the device, and both aprons are extended and retracted simultaneously by simultaneous movement of their associated support means. However, the upper apron establishing endless belt can be caused to rotate or not rotate relative to its own support means so that an object can be repositioned on an uppermost surface of the upper apron when required. Extending and retracting movements of the aprons can be controlled separately from movements which effect a repositioning of an object on an upper surface of the superposed aprons.

The basic method of handling on object in accordance with the present invention includes steps of simultaneously extending the above described support means of the upper and lower aprons in generally horizontal planes towards an adjacent surface so as to rotate the leading edges of the upper and lower aprons in opposite directions. During extension movements, the leading edge of the upper apron rotates upwardly, and the leading edge of the lower apron rotates downwardly. During retraction movements converse rotations take place. The method includes steps of repositioning, when necessary, by moving the uppermost surface of the upper endless belt relative to its associated support means. In addition, a specific method for changing a sheet under a patient on a bed is provided by the present invention.

These and other advantages and features of the present invention will become apparent from an understanding of the more detailed discussion which follows, and in that discussion reference will be made to the accompanying drawings as briefly described below.

DETAILED DESCRIPTION OF INVENTION

Figure 1:
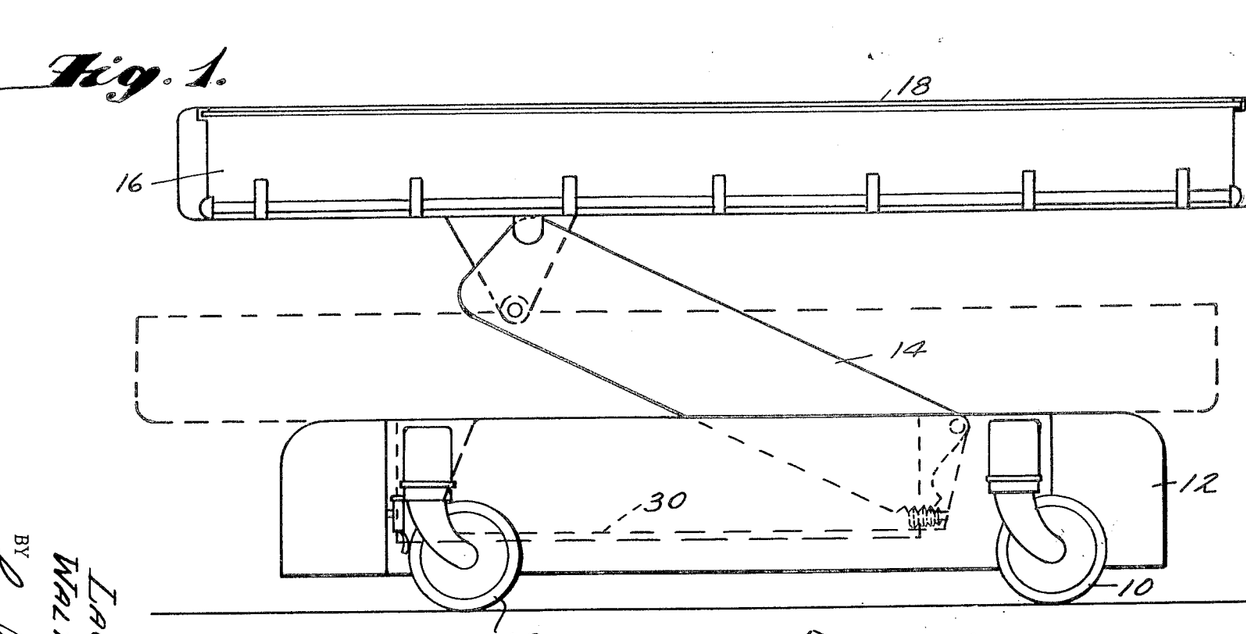
FIG. 1 is a side elevational view of a transporter device of the type contemplated by the present invention.
Figure 2:
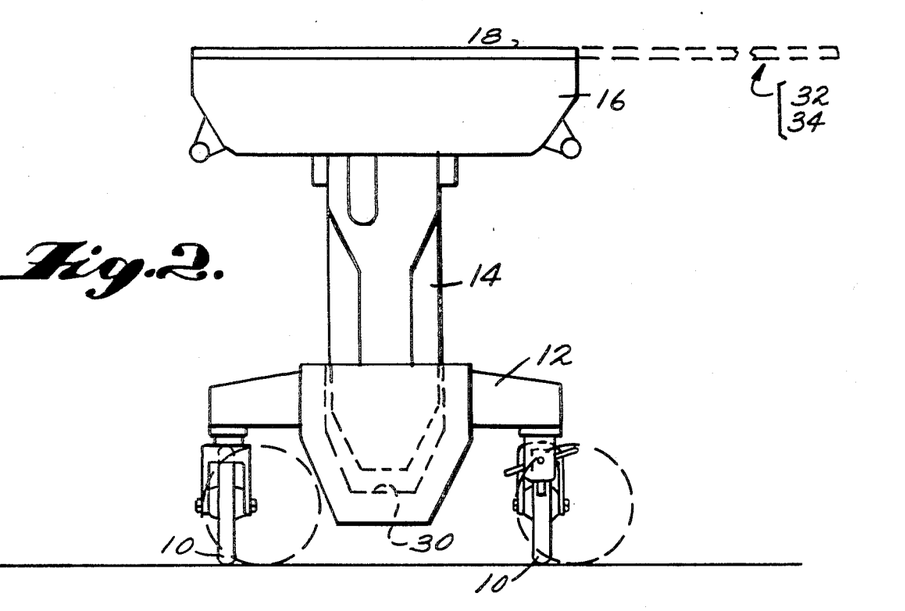
FIG. 2 is an end elevational view of the same device shown in FIG. 1.

Referring to FIGS. 1 and 2, a typical embodiment of a transporter device in accordance with the present invention is illustrated. This form of transporter device is especially useful for transferring and carrying patients or non-ambulatory individuals from place to place. As with the device described in our aforesaid application, patients may be gently and carefully transferred from one surface area to a surface of the transport device itself and then to another surface area at another location in a building. The illustrated device includes wheels or casters 10 so that it may be easily rolled and moved from one location to another, and in hospital usage the wheels are formed of conductive material to provide a ground for static electricity. The device itself may be considered as including a base portion 12 having a vertical lifting section 14 together with an upper portion 16 which carries two superposed endless belt means for receiving, carrying, and depositing a patient or other object. The lifting section 14 functions to provide vertical adjustment movements for the upper portion 16 relative to the base portion 12, and this permits an adjustment of the uppermost surface 18 of the device to match the height of an adjoining surface to or from which an object is to be moved. The phantom lines in FIG. 1 illustrate a lowermost position for the upper portion 16 relative to the base portion 12.

Figure 3:
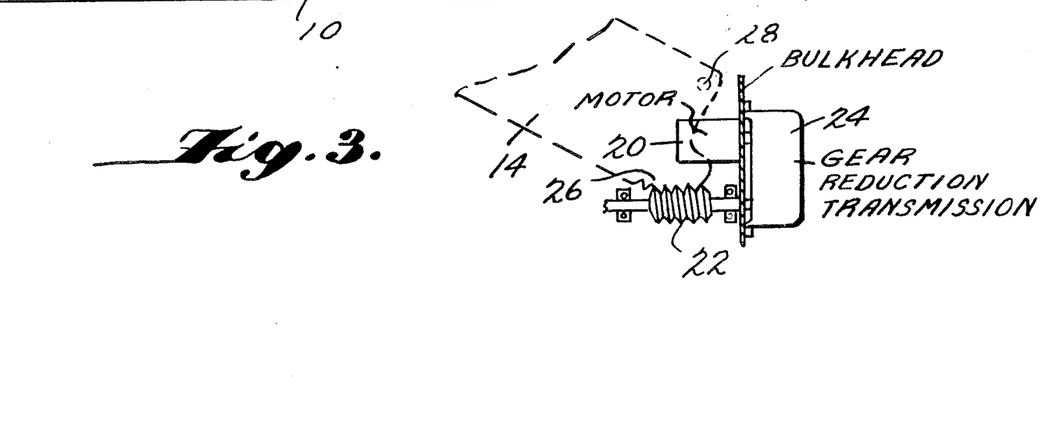
FIG. 3 is a detailed fragmentary view of a portion of a lifting and lowering mechanism associated with the device of FIG. 1.

FIG. 3 illustrates details of a preferred system for operating the lifting section 14 to effect vertical adjustment of the upper portion 16 relative to the base portion 12. An electric motor means 20 provides a source of power for rotating a worm drive gear 22 through a transmission box 24, and this advances or retracts a segmental gear portion 26 of the central lifting section 14. Since the lifting section 14 pivots about a fixed pivotal axis 28, advancing and retracting movements effected by the worm drive gear 22 cause the lifting section to raise or lower according to the direction of drive of the worm gear. This arrangement is preferred for the type of device illustrated because there is little or no space in the upper portion 16 for actuating mechanisms, such as hydraulic rams and other similar devices, for changing the position of the upper portion 16 relative to the base portion 12. With the illustrated arrangement, the lifting section 14 can fit into a recessed area 30 provided in the lower base portion 12 when the unit is adjusted to its lowermost configuration, and there is no need for a use of space within the upper portion 16. Thus, there is provided a very reliable and convenient arrangement for lifting and lowering the entire upper surface of the transporter device to accommodate the device to varying heights of surface areas to or from which objects are to be transferred.

Figures 4, 4A, 5, 5A:
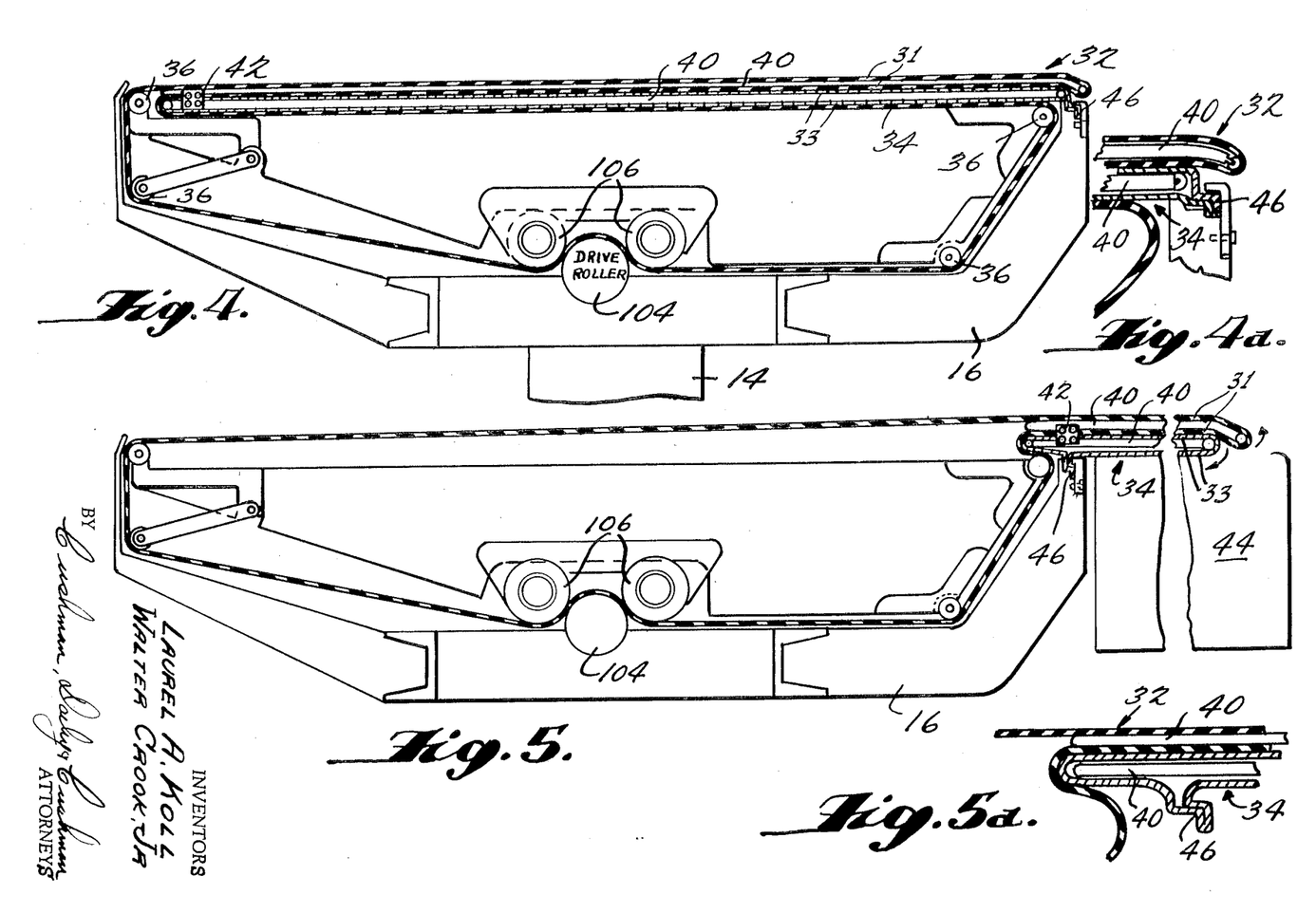
FIG. 4 is an end elevational view, of an upper portion of the transporter device, showing upper and lower aprons in fully retracted position.
FIG. 4a is an enlarged detailed view of a portion of the view shown in FIG. 4.
FIG. 5 is a view similar to the one shown in FIG. 4, but showing upper and lower aprons in fully extended positions laterally outwardly from the transporter device (a portion of the drawing is cut away in the region of the extended belts to conserve space in the drawings)
FIG. 5a is an enlarged detailed view of a portion of the view shown in FIG. 5.

FIGS. 4 and 5 represent end views of the upper portion 16 as seen from the end shown in FIG. 2. FIGS. 4 and 5 represent details of structure associated with mechanisms for advancing and retracting two superposed aprons laterally outwardly from and back to the upper portion 16 of the device. Advancing movements are towards the right of the views of FIGS. 4 and 5. End cover plates have been removed from the upper portion 16 so that details of apron defining belt driving and controlling mechanisms can be seen. FIGS. 4a and 5a represent enlarged fragmentary views showing details of relationships between the two endless belts establishing the aprons when in retracted and extended positions, respectively. As with our previous invention, an upper apron 31, established by an endless belt means 32, is superposed over a lower apron 33, defined by an endless belt means 34, in such a way that an uppermost surface or flight of the endless belt means 34 is in contact with an underside portion or lower flight of the upper apron 31. Portions of the belt or apron surfaces remain in contact with each other during all translating movements and for all positions of the two aprons 31 and 33. However, the upper apron 31, unlike the arrangement of our previous invention, is established by the endless belt 32 formed with such a dimension and configuration as to nearly enclose all surfaces of the lower apron defining endless belt means 34 when both aprons are in the fully retracted position shown in FIG. 4. For convenience of illustration and understanding of the invention, the upper apron defining endless belt means 32 has been illustrated with alternating shaded and unshaded segments, and the lower apron or endless belt means 34 is illustrated with closely spaced vertical lines. These representations are not intended to illustrate a cross-hatching of the two belts shown in FIGS. 4, 4a, 5 and 5a, but rather to show the relationships of the two belts for different positions relative to the transport device itself.

Figure 6:
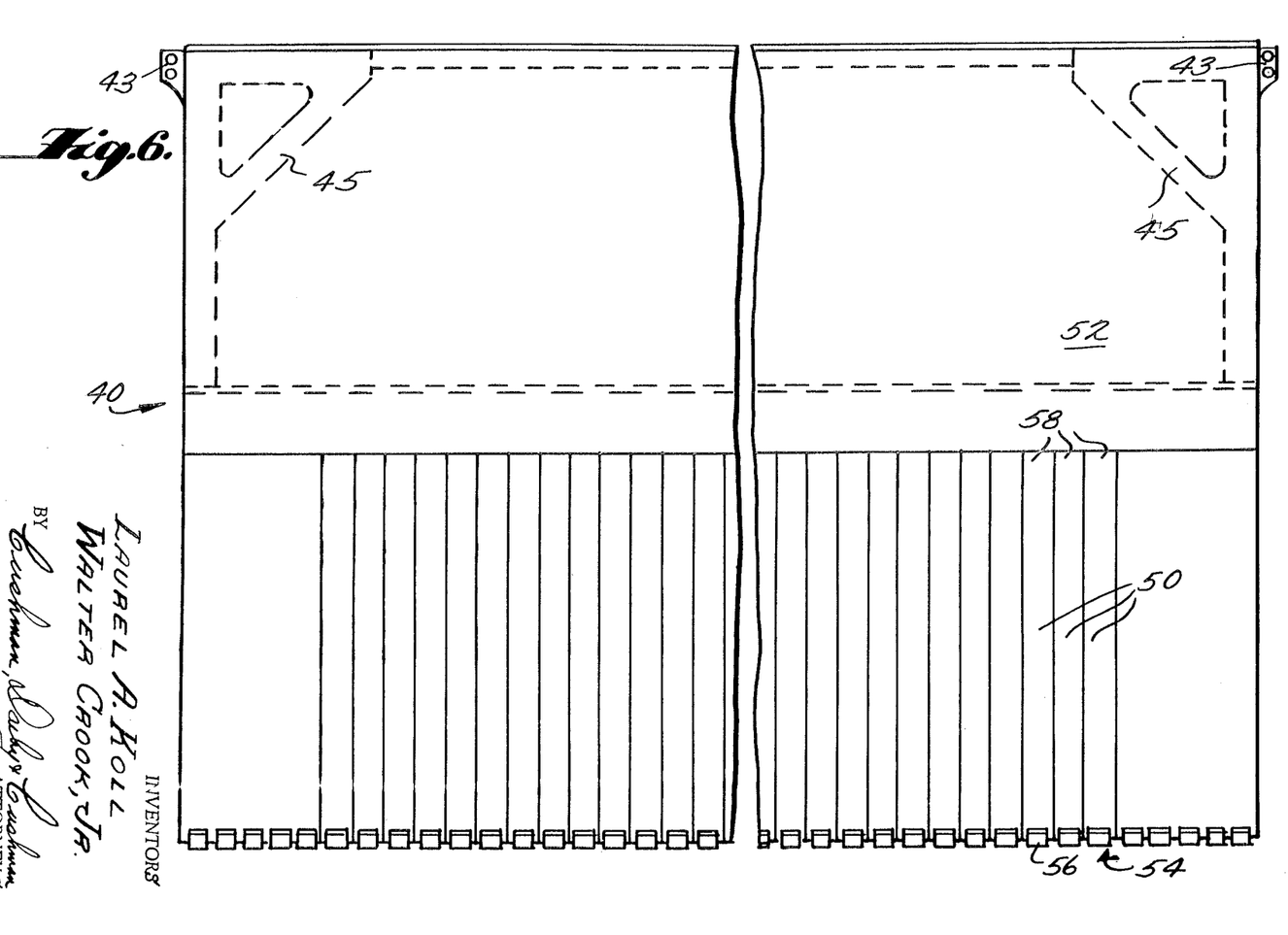
FIG. 6 is a top plan view of a novel support means used with either or both of the upper or lower aprons of the device of this invention.

As can be seen from FIGS. 4 and 4a, the endless belt 32 extends across the entire top area of the transport device and around a number of guiding rollers 36 and across the underside and around the top side of the endless belt 34 to complete its continuous path. The endless belt means 34 is less extensive in dimension, and its configuration is one of extending around the leading and trailing edges of a support means 40 contained within its confines, as shown in FIG. 4. A similar support means 40 is provided for the upper apron portion of the endless belt means 32. Generally, the two support means associated with the two aprons function to maintain the two aprons in superposed, contacting relationship with one another and to provide broad flat surfaces upon which objects may be carried. As will be discussed in greater detail below, the aprons themselves are advanced and retracted by translating movements of the support means 40 in generally horizontal planes, rather than by a positive driving of either of the belts defining the aprons. The support means 40 also function to separate opposed surfaces of the aprons, and each support means 40 is constructed generally as shown in FIG. 6. Also, FIG. 7 includes an end view of the two support means 40 as they would appear without the two aprons wrapped around them. Both support means 40 are extended or retracted relative to the top surface of the transporter device by a common driving means which effects simultaneous movement of both support means. The common driving means is preferably in the form of a drive chain, or its equivalent positioned at each end of the device. Each driving means is secured by a mounting bracket member 42 to trailing edge portions of both of the support means 40. In FIG. 4, the support means 40 are both in fully retracted positions which place the two aprons in positions for covering and fitting the shape of the upper surface area of the transporter device. In this mode, the transporter device can be used for wheeling an object from one location to another, and all weight of the object is directed downwardly through the two aprons and the two support means 40 associated with them. FIG. 4 also shows the mounting member 42 in its full rearward position. The driving chain has been omitted from the views of FIGS. 4 and 5 for purposes of clarity, but the driving chain would be connected to the mounting member 42 in such a way that movement of the chain would be translated to both support means 40 simultaneously. FIG. 5 illustrates the transporter device and the endless belt means 32 and 34 after the aprons 31 and 33 respectively defined thereby have been extended to maximum lateral positions relative to the base portion (or main body or upper frame portion) of the transporter device by a movement of the two support means 40 towards the right of the illustration. It can be seen that the mounting member 42 has been moved to a limit position towards the right, and this movement carries both support means 40 and the two aprons to the extended positions shown. FIG. 5 also shows the superposed aprons as being placed on an upper surface of a bed 44, or other object. Again, all weight of an object which is placed or carried on an uppermost surface of the extended upper apron 31 is directed downwardly through both aprons and both support means, as with our previous invention.

FIG. 5 also shows relative rotational movements of the leading edges of the upper and lower aprons during a lateral translating movement which extends the two aprons over the surface defined by 44. As shown by the arrows, the leading edge of the upper apron 31 rotates upwardly while the leading edge of the lower apron 33 rotates downwardly, thereby providing for a gentle lifting action of an object onto the uppermost surface of the upper aprons during the extension movement. In this sense, the two superposed aprons operate in much the same manner as fully described and explained in our aforesaid patent application. FIG. 5 also illustrates the arrangement of the upper apron 31 as being such that a portion of the endless belt 32 completely covers the top of the transporter device at all times, whether the two aprons are extended or retracted. This eliminates any gap or depression in the surface of the transporter device when the two aprons are in extended positions and is possible in the embodiment shown because of the stored supply of belt material constituted by the loop in the belt 32 trained about the top, bottom and trailing flight portions of the lower belt 34 in the retracted position as shown in FIG. 4 of the drawings.

Although the leading edges of the upper and lower aprons of the present invention present similar rotational characteristics to what was described for our previous invention, there is a substantial difference in operation and function for remaining surfaces of the two endless belt means defining the aprons. These differences are primarily a result of changing the positions of the two endless belts by advancing and retracting their respective support means rather than by positively driving the belts themselves. Thus, when the two support means 40 are extended outwardly from the top surface of the transporter device (from the position shown in FIG. 4 to the position shown in FIG. 5), there is no requirement for driving and synchronizing rotational movements of the two endless belts relative to their respective supports or to each other because their rotational movements will be automatically determined by positioning movements applied to their associated support means. This eliminates certain requirements for tension control and synchronization of the belts themselves and avoids problems which would otherwise result from slippage between the belts or from a lack of synchronization when the belts themselves must be driven. In accordance with the present invention, the endless belt 34 defining the lower apron 33 includes a section 46 which remains, at all times, fixed to a leading edge area of the transporter device itself. In the illustrated embodiment, the belt section 46 comprises a section of the endless belt 34 which is clamped into a part of the transporter device upper frame. Any suitable clamping or securing means may be used. Thus, the lower apron 33 cannot be rotated relative to the transporter device in any given lateral position of the lower aprons. Operation and control of the two aprons and the endless belts defining them will be described in greater detail in a later part of this specification.

FIG. 6 illustrates a preferred construction for the support means 40 for each of the aprons used with the transporter device of this invention. An identical support means 40 would be used for each apron, and the construction which is shown in FIG. 6 is preferred for uses where a high degree of flexibility of the endless belt is desired. For example, when the transporter device is to be used for loading, unloading, and carrying patients, it is necessary that the leading edges of the two aprons be sufficiently flexible to generally conform the leading edges to the shape of the object being lifted from an adjoining surface. This flexibility is provided by the non-rigid support means carried within the two endless belt means defining the aprons, and various structures and materials may be used to provide such a non-rigid characteristic. However, the arrangement shown in FIG. 6 represents a preferred construction for a transporter device used for handling patients.

The preferred support means 40 is constructed to include a plurality of discrete finger elements 50 extending outwardly from a contiguous, integral section 52. The fingers 50 extend towards a leading edge 54 of the support means, and the leading edge of each finger can flex upwardly and downwardly relative to the leading edge of an adjoining finger. In addition, each finger is provided with a roller element 56 at its leading edge to permit rotational movements of an associated endless belt relative to the support means. In hospital usage, it may not be necessary to provide for separate fingers for the entire length of the separator means, but fewer or additional fingers from the number illustrated may be used when desired. Also, the individual fingers 50 can be of varying dimensions and flexibility along the length of the separator means 40, if desired. The illustrated separator means may be formed from a sandwich construction which provides for upper and lower surface plates within which a lighter weight core is sandwiched. The individual finger elements 50 are contiguous with the portion 52 at their individual base ends 58. Alternatively, individual finger elements 50 can be secured to the portion 52 by fastening their base ends 58 to the portion 52 with suitable fastening devices. The roller elements 56 are carried within cutout sections formed at the leading ends of the finger elements 50, and are mounted on axles or axle stubs extending transversely across each end of the individual finger elements.

FIG. 6 also illustrates mounting bracket elements 43 which function to connect the driving means of the unit to the individual support means 40. The mounting bracket elements 43 comprise protruding portions of relatively large members 45 carried within the sandwich structure of the support means, thereby reinforcing the support means at the points of driving connection to a drive chain. The entire support means structure 40, as shown in FIG. 6, is contained within one of the endless belt means and is driven by a driving means which advances and retracts both support means simultaneously at the same rates and distances of movement.

Figures 7, 11:
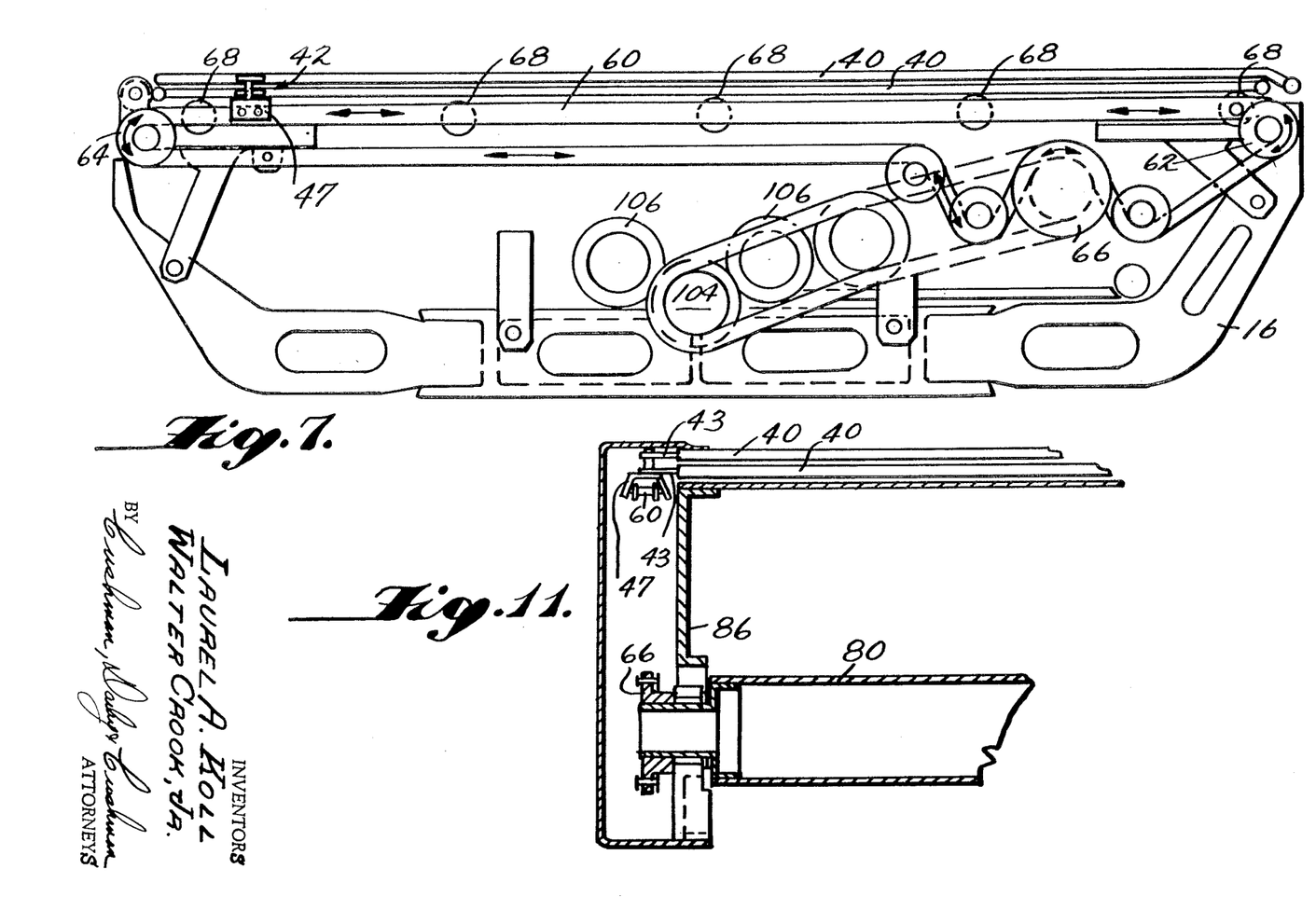
FIG. 7 is an end elevational view, on enlarged scale, of a driving means associated with the two support means for the two aprons of the device.
FIG. 11 is an enlarged elevational view, in cross-section, as seen generally from one side of the unit to show part of the drive train detail of the device.
Figures 8, 9, 10:
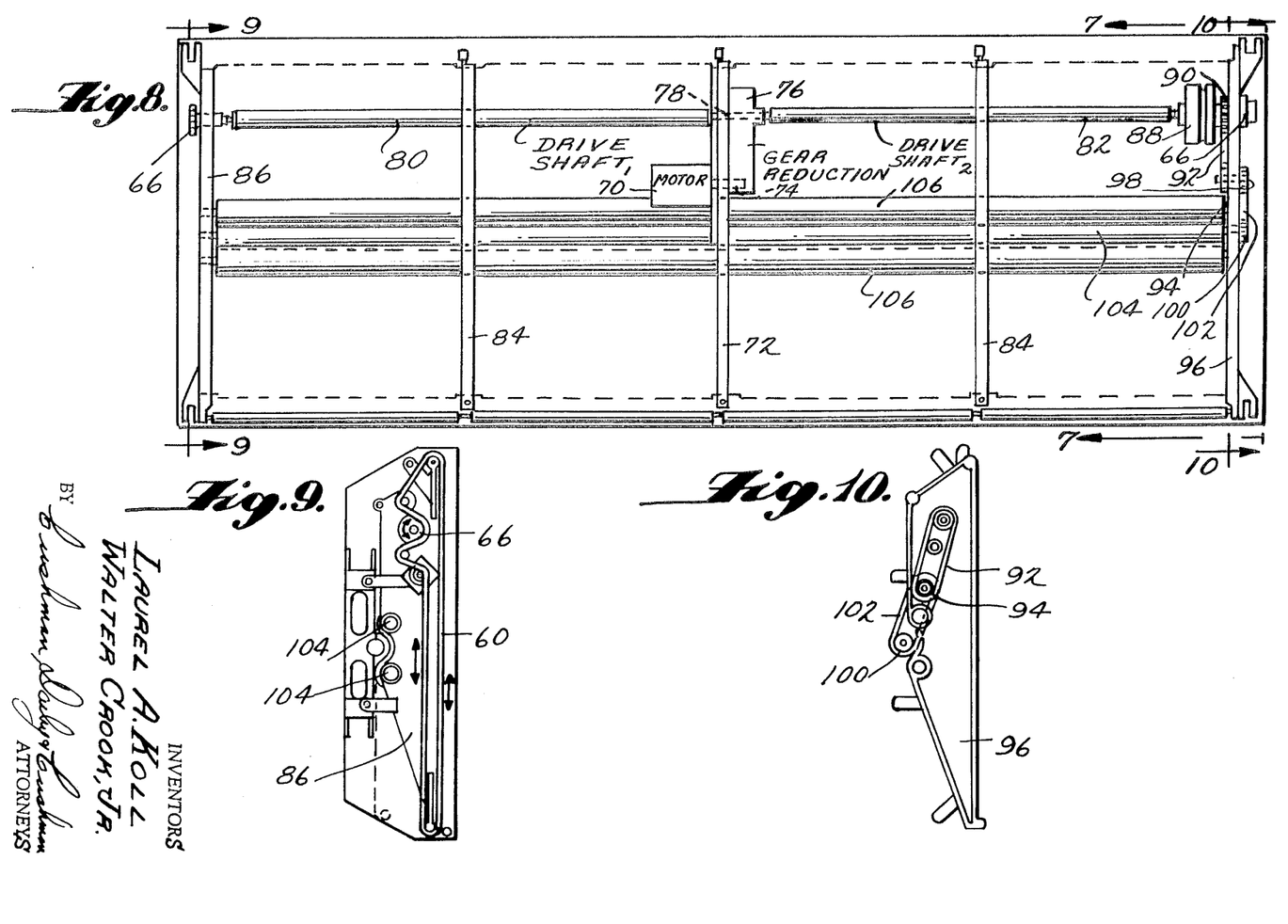
FIG. 8 is a top plan view, on reduced scale from what is shown in FIG. 7, of a drive train arrangement for the driving means of FIG. 7.
FIG. 9 is an end elevational view of the driving means, as seen along lines 9—9 of FIG. 8.
FIG. 10 is an end elevational view of the driving means as seen along lines 10—10 of FIG. 8.

FIG. 7 illustrates portions of the driving means of the present invention as related to the two support means 40. As shown, both support means 40 are secured together by a mounting bracket member 42 which, in turn, is secured to an endless drive chain means 60. The two support means 40 may be secured to the mounting bracket member 42 by any suitable fastening arrangement which provides for a fixed spacing of the two support means 40 and which maintains them in the superposed condition which is illustrated. A typical mounting arrangement would provide for an inverted U-shaped element 47 (also, see FIG. 11) which could be secured to the drive chain means 60 and which could receive a fastening bolt extending downwardly through the mounting bracket elements 43 of the upper and lower support means. The drive chain means 60 can be driven back and forth, as shown by the arrows throughout its length, to advance or retract the two support means and their associated aprons in accordance with a desired sequence of movements. The endless chain means 60 is guided around leading and trailing sprockets 62 and 64, respectively, to present an upper level straight path of movement of the driving chain means along a line which is parallel to the horizontal planes in which the support means 40 are intended to operate. A lower level of the endless driving chain means 60 passes around a driving sprocket 66 which can be rotated in opposite directions from a suitable power source. A similar driving chain means is provided at an opposite end of the transporter device (from what is shown in FIG. 7), and a driving and control system is operatively connected to both driving chains of the transporter device, as shown in FIGS. 8–10. The guiding sprockets 62 and 64, and other guiding pulleys or sprockets which are shown in FIG. 7 are mounted in fixed positions in bulkhead portions of the top portion 16 of the transporter device so that the endless driving chain has a fixed path of reciprocating movement relative to the transporter device itself. Roller elements 68 extend longitudinally down the frame, which makes up the upper portion 16 of the device thereby to provide a horizontal deck, for supporting the aprons and the support means 40 across the top surface area of the transport device.

Figure 12:
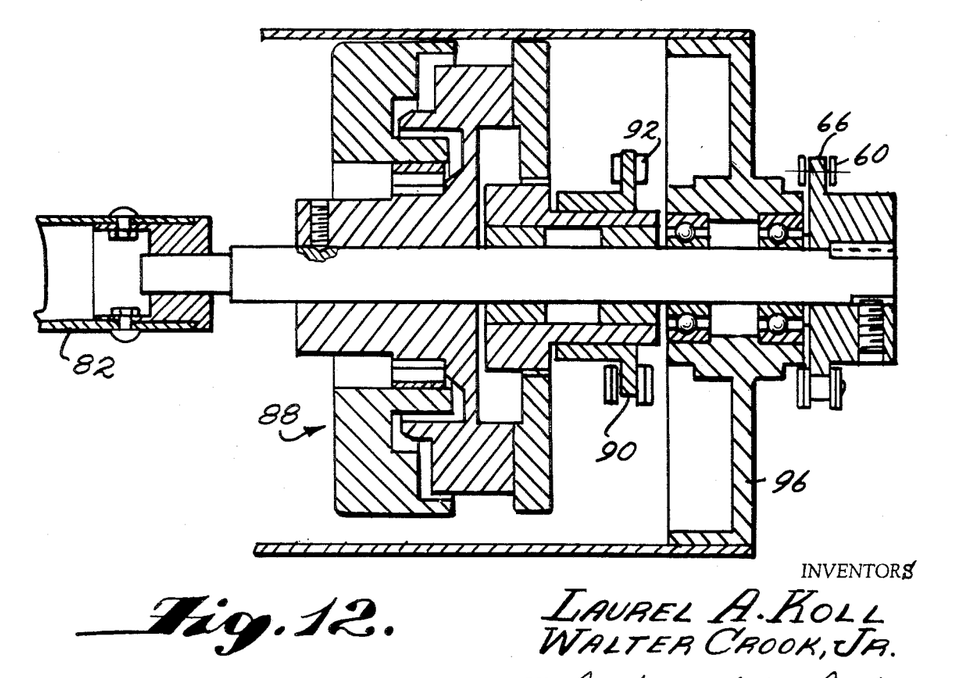
FIG. 12 is an enlarged elevational view in cross-section showing another detail of the drive train arrangement of the device.

FIG. 8 represents a top plan view of the upper portion of the transporter device with both endless belt means and both support means removed to expose an upper frame of the device. This is done to illustrate a drive train associated with the endless driving chains (for driving the support means 40) at each of the ends of the transporter device. In the FIG. 8 view, the upper direction of the drawing represents the loading and unloading side of the device, and the bottom part of the drawing represents the side form which an operator would control the unit. As illustrated, an electric motor means 70 is mounted against one vertical wall of a middle bulkhead 72 so that its output shaft 74 extends through the middle bulkhead and into a gear reduction transmission 76. The gear reduction transmission is secured to an opposite vertical face of the middle bulkhead 72 from the side on which the motor 70 is carried. The gear reduction transmission unit carries an output shaft 78 which extends completely therethrough so that the output of the gear reducion unit can be delivered to opposite ends of the transporter device through two separate drive shafts 80 and 82. A typical gear reduction system would provide for a 267:1 reduction from the motor 70 to the output shaft 78 to produce about 20 r.p.m.'s of the drive shafts 80 and 82. The drive shafts 80 and 82 extend through openings or spaces provided in intermediate bulkheads 84 and to the opposite end bulkheads 86 and 96, respectively. FIG. 11 illustrates a typical bearing support and mounting for the drive shaft 80 through the end bulkhead 86, and FIG. 12 illustrates a mounting of the drive shaft 82 through the opposite end bulkhead 96.

As discussed above, a sprocket wheel 66 is secured to the output end of each drive shaft 80 and 82 for driving the endless drive chain 60 at each end of the transporter device. A similar arrangement is provided at each end of the device for driving an endless chain, with the exception that an electric clutching mechanism 88 is interposed at one end for controlling drive rollers associated with the upper apron defining endless belt means 32. The electric clutching means functions solely to make and break a driving connection from the drive shaft 82 to a driving mechanism associated with the endless belt means 32, but a driving connection between the drive shaft 82 and its associated driving chain 60 for moving the support means 40 is maintained at all times (see FIG. 12). Any suitable arrangement of couplings and driving means may be used for this purpose, but a typical arrangement is illustrated in FIGS. 8, 10 and 12. As shown in detail in FIG. 12, the drive shaft 82 directly drives a sprocket 66 corresponding to the same type of sprocket located at the opposite end of the device (see FIG. 8). This sprocket 66 drives an endless chain which is arranged to follow a path identical to that shown in FIG. 9 (see the view of FIG. 7, as discussed above). Thus, rotational movements of the drive shaft 82 will result in an advancing or retracting of the endless chain 60 associated with the sprocket 66, and an identical movement will take place at the opposite end of the device at the same time.

The electrical clutch means 88 functions to engage or release from rotation a separate drive sprocket 90 (see FIG. 12) which controls an endless chain associated with a control mechanism for the upper endless belt means 32. As shown in FIGS. 8, 10 and 12, a chain 92 is interconnected between the drive sprocket 90 and another sprocket 94 mounted on an axle extending through the end bulkhead 96 of the device. On the outer side of the end bulkhead 96, a second pair of sprockets 98 and 100 are mounted and driven by a separate endless chain 102. The sprockets 94 and 98 are fixed to a common axle stub. The purpose in utilizing two endless chains 92 and 102 is one of fitting the driving mechanism through a bulkhead portion of the device so that a roller 104 which contacts the endless belt means 32 can be controlled. As shown in FIG. 8 (also see FIG. 7) the roller 104 is positioned relative to two idle rollers 106 to form a tortuous path for the upper apron defining endless belt means. The three rollers 104 and 106 extend for the entire length of the device, as shown in FIG. 8, and the intermediate bulkheads 72 and 84 are shaped to permit passage of the three rollers and the endless belt contained between them. The actual relationship of the rollers to the endless belt 32 is shown in FIGS. 4 and 5. By operating the electric clutching means 88 it is possible to drive or brake the roller 104 in accordance with control signals dictated by an operator. Suitable circuiting and electrical connections and switches are provided for carrying out such control functions in a well known manner. This permits a desired control of relative movement of the endless belt 32. The electric clutching means 88 which has been just described can be removed and replaced with a separate electric motor for controlling the roller 104 if desired.

Having described the structural features of the transporter device of this invention, one can now appreciate a discussion of the methods of operation and use of the device. This discussion will make reference to FIGS. 4, 4a, 5, 5a, and 13–15.

The device can be operated for a number of loading, unloading and re-positioning movements by a single operator. Suitable control switches are connected to electrical circuiting that includes the electric motor means and clutching means. A typical arrangement would provide for three control switches, each having two control functions that can be alternatively selected, as represented by the following:

| RAISE | EXTEND | LOAD |
|---|---|---|
| LOWER | RETRACT | UNLOAD |
| (1) | (2) | (3) |

With the above arrangement, the first control switch functions to raise and lower the device by operating the electric motor means 20 discussed above with reference to FIG. 3. Thus, the operator can adjust the uppermost surface of the transporter device to match an adjoining surface so that an object can be received from or deposited upon the adjoining surface. The second and third control switches represented above provide for control functions relating to movements of the two aprons established by the endless belt means 32 and 34. The second and third switches are interrelated in their functions in such a way that the electric clutching means 88 for controlling the endless belt means 32 is operated in accordance with a combination of two functions selected between switches 2 and 3. For example, when the "load" switch is activated, the electric clutching means 88 will be engaged to drive the sprocket 90 only when the switch for "retract" is also activated. On the other hand, when the "unload" switch is activated, the electric clutching means 88 will be engaged to drive its sprocket 90 only when the "extend" switch is also activated.

As discussed above, with reference to FIGS. 4 and 5, the lower apron defining endless belt means 34 cannot be separately rotated relative to its support means 40 except by advancing and retracting movements of the support means itself. In contrast, the upper apron defining endless belt means 32 can be selectively locked or rotated by the three rollers 104 and 106. The endless belt means 32 is locked by the three rollers during loading and unloading cycles, and it is rotated by the drive roller 104 during retrieving and positioning cycles. Rotation of the endless belt means 32 is carried out at the same speed as the speed at which the support means 40 are being moved by their separate driving means.

When it is desired to load an object onto the upper apron 31 from a surface area which adjoins the transporter device, the transporter is moved to a position adjacent to the object, and it is raised or lowered so that its upper surface matches the surface upon which the object is resting. Then, the operator activates the "extend" function of switch (2) to activate the electric motor means 70 in a direction of drive that will advance both support means 40 laterally outwardly from their stowed positions at the top of the transporter device. In addition, the operator will activate the "load" function of switch (3), and this means that the electric clutching means 88 is not engaged, thereby resulting in a locking of the endless belt means 32 relative to the drive roller 104 and its two associated idle rollers 106. Locking is effected by the tortuous path provided between the three rollers and by the pressures of the rollers on the opposite surfaces of the endless belt means 32. As a result of this combination of controls, the support means 40 for both aprons 31 and 33 will advance towards and over the surface upon which the object is resting. During the advancing movement of the two aprons, the leading edge of the upper apron 31 will rotate upwardly and rearwardly while the leading edge of the lower apron 33 will rotate downwardly and rearwardly. However, since both endless belts establishing the aprons are fixed relative to the transporter device itself, there will be no relative motion between the two aprons and the transporter device, the adjoining surface, or the object to be loaded. The two support means simply roll the two aprons out over the adjoining surface and under the object with no relative movement at all between the uppermost and lowermost surfaces of the two aprons and the surfaces which they contact. This means that there are no lateral forces applied to the object being loaded, and there is only a gentle lifting force as the two endless belts roll underneath the object. Stated differently, the upper apron 31, being in a stationary first condition relative to the object being loaded and to the support 40, insulates the object from frictional contact with the upper support 40 as the latter moves out or is translated beneath the object. This represents a very safe and gentle way in which to lift a patient or other object onto the upper apron 31.

Once the object is received onto the uppermost surface of the upper apron 31 by the loading cycle discussed above, the object can be retrieved by activating the "retract" function of the second switch shown above. Since the object is then being loaded onto the transporter from the surface on which it originally rested, the operator will leave switch (3) in its "load" function. This combination of control signals results in (a) a reversal of the electric motor means 70 to reverse the movements of the drive chains 60 which move the two support means 40, and (b) a rotation of the upper apron defining endless belt 32 at the same rate of speed as the two support means are being moved. During the retrieving cycle, the upper apron defining endless belt means is rotated by an engagement of the clutching means 88 so as to take up slack on the upper side of its path of movement (as caused by the support means 40 retracting) and to supply a requisite amount of belt length to the lower side of the support means. Since the endless belt means 32 is rotated by the drive roller 104 at the same rate of speed as the support means 40 are being retracted, there is zero motion of the upper apron 31 relative to the retracting separators 40. This means that an object being retrieved during retraction of the two support means will not be moved relative to the support means themselves and will remain in whatever position was established for the object at the beginning of the retrieving cycle. In other words, the upper apron at this time is in a second condition by which frictional contact between the support 40 and the object or load is established through the upper apron 31.

If a patient or other object needs re-positioning on the upper apron surface before being retrieved back to the top area of the transporter device, the operator simply advances the support means further outwardly until the object is placed in a desired position relative to the leading edges of the two aprons. Then, when the object is retrieved by activation of the "retract" and "load" switch functions, it will not change its position relative to the retracting leading edges of the two aprons.

It can be seen that if an object is already on the upper surface of the transporter device with the two support means and their associated aprons in their stowed positions, unloading of the object can be carried out by reversing the loading cycle. This means that the "unload" function of switch (3) will be combined with the "extend" function of switch (2) to carry the support means and the object out to an adjoining surface upon which the object is to be unloaded or deposited. This combination of switch functions results in the endless belt means 32 being driven at the same rate of forward movement as the driving movements of the two support means 40. Thus, the object or patient does not remain behind on the upper part of the transporter device while the two aprons are advancing towards the adjoining surface, but rather, the object is carried along with the two aprons without changing its position relative to the leading edges of the two aprons. Once the aprons are in fully extended positions, the object can be unloaded by activating the "retract" switch function and without changing the 'unload" switch function.

Figure 13:
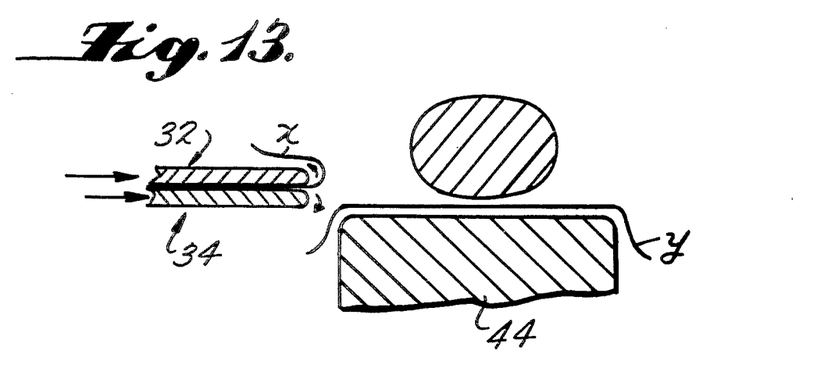
FIG. 13 is a schematic view illustrating a beginning step of operation for changing a sheet under a patient.
Figure 14:
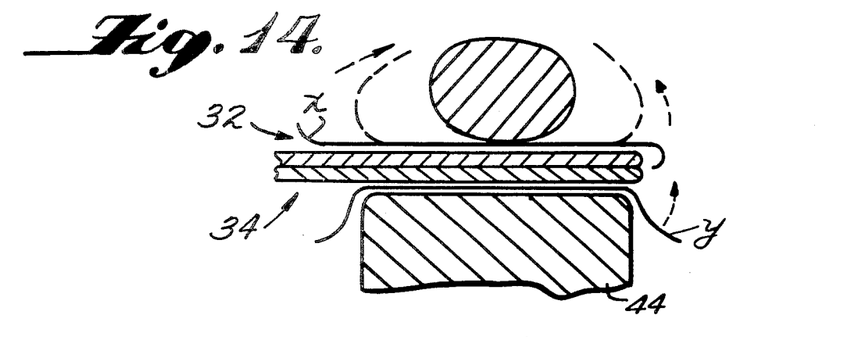
FIG. 14 is a view similar to FIG. 13, showing a further step of the sheet changing method.
Figure 15:
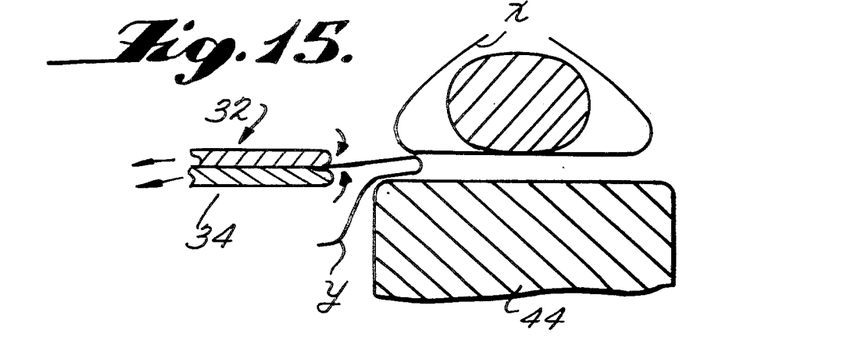
FIG. 15 is a view similar to FIGS. 13 and 14, showing a retraction step in sheet changing.

Referring to FIGS. 13–15, a method for changing sheets under a patient on a bed is illustrated. Relationships between contacting surfaces have been exaggerated and spaced apart in the FIGS. 13–15 for purposes of clarity. As a first step in the method, a fresh sheet *x* is fitted between the upper and lower aprons 31 and 33 so as to leave one longitudinal edge exposed and folded over the top of the upper apron 31. The remainder of the sheet is fitted between the two aprons by simply sliding and tucking it between the two aprons. In the usual type of transporter which will be used in hospitals, it will be necessary to fold the upper and lower ends of the sheet back (and the same being done to the sheet already on the bed) so that the relatively long sheet can fit within the confines of the length provided by the transporter device. Then, the aprons, with the retained new sheet *x*, are extended over a sheet *y* to be removed and beneath a patient resting on the sheet *y*. FIGS. 13 and 14 represent this extension movement. It can be seen that as the two aprons are extended outwardly, the sheet *x* is fed out from between the two aprons, with its original exposed edge remaining in the same position relative to the bed 44 upon which the patient is resting. Once the FIG. 14 position has been achieved, the edge of the sheet *x* which is more remote from the position of the transporter device is wrapped up around the patient temporarily so that a corresponding remote edge of the sheet *y* can be tucked in between the two aprons. Also, the near edge of the sheet *x* is wrapped up and over the patient temporarily so that the two aprons, and the retained sheet *y*, can be removed from beneath the patient. FIG. 15 represents the removal of sheet *y* from the bed, and the removal step will cause the sheet *y* to be drawn into the area between the two aprons. Thus, there is provided a method for changing the sheet on a bed upon which a non-ambulatory patient may be resting, and the sheet changing operation can be carried out with a minimum of disturbance to the patient. If desired, the patient can be first loaded onto the upper surface of the aprons and retracted back to the transporter for bathing or other treatment or for permitting a changing of sheets in a conventional manner without the patient being in the bed. Bathing can take place on the upper apron, which is preferably coated with a low friction, water-repellant material, without any concern about water damage to the transporter device and without any possibility of a dampening of the bed itself.

The invention described above represents a very useful device having many possible applications to problems concerned with handling patients or cargo. The device can be used in a variety of configurations and arrangements and in combination with other handling devices, if desired. Although a preferred embodiment of the invention has been described above with reference to a transporter device useful for patient handling, it is not intended that the claims which follow be limited to such a specific embodiment. In addition, changes and modifications in the basic device described above will become apparent to those skilled in this art, and obvious and equivalent changes are intended to be included in the scope of this invention. The device may be modified for particular use requirements. For example, the hospital transporter which is discussed above can be provided with permanent guard rails around three sides of the device and with a movable guard rail on the fourth side (which will be the loading and unloading side of the unit). The movable guard rail on the fourth side can be pivotally mounted to the unit in such a way that it can be moved and locked upwardly into a guarding position or downwardly out of the way of operation of the unit. In addition, its pivotal mounting can provide for a breaking of all loading and unloading circuits when the guard rail is in its guarding position for retaining a patient while being transported from one location to another on the device.

The endless belt means defining the upper and lower aprons can be manufactured from known materials. For example, a non-stretchable, woven glass fiber belt with a Teflon (registered trademark of Du Pont) coating may be used. The endless belts should be grounded into the device itself to remove static electricity from the endless belt. The two support means 40 discussed above with reference to FIG. 6 can be manufactured from metal or plastic materials, or a combination of such materials. The upper support means may be provided with downwardly inclined leading edge, as shown in FIG. 7, so that it extends downwardly over the leading edge of the lower support means slightly to assist in a lifting of an object onto the upper endless belt means. The transporter device can be manufactured in any size and shape that may be desired. The embodiment described above should be of a sufficient length to carry the body of a patient, and its width can be about 28 inches for patient handling purposes. With a 28 inch width, it is possible to obtain a 26½ inch extension of the aprons laterally from the top area of the transport device, and this represents substantial extension and retraction capabilities for a device of this type.

Limit switches may be included in the circuiting to shut off the electric motor means 70 when extreme limits of extension or retraction of the support means 40 are reached during normal operation of the device. In addition, the control switches and functions discussed above can be changed, and additional control functions can be added if desired.

Also, the lifting section 14 of the described transporter device can carry a strain gauge, or equivalent, device for automatically weighing an object received on the aprons. A read-out of the weight could be provided at a location where it could be easily seen by an operator during use of the transporter device.

Locking or fixing of the upper endless belt 32 relative to the rollers 104 and 106 can be effected by additional braking means, if desired.

What is claimed is:

1. A transporter device for transferring and carrying objects comprising:
   a pair of endless belt means defining upper and lower aprons superposed one above the other in an orientation of the device which provides for a horizontally disposed upper surface to receive and carry objects on the device,
   upper and lower support means respectively associated with said upper and lower aprons, said support means functioning to contact inner surfaces of the aprons to maintain the aprons in substantially flat, thin planes, and said support means being non-rigid so that the weight of even an irregularly shaped object is transferred through the aprons and their associated support means to an area of surface directly beneath the object when the object is supported by said aprons.
   driving means for translating said support means of said upper and lower aprons relative to a base portion of said transporter device so that the aprons can be extended in horizontal planes outwardly away from or retracted backwardly towards the base portion of the transporter device to move an object relative to said base portion, and
   means for fixing the position of a part of at least one of said endless belt means relative to said base portion during extending and retracting movements of said support means.

2. The transporter device of claim 1 wherein said last-named means for fixing the position of at least one of said endless belt means comprises means for permanently fixing the position of a lowermost section of said lower apron defining endless belt means relative to said base portion so that the remainder of the lower apron can follow translating movements of its associated support means.

3. The transporter device of claim 2 and including additional means for selectively fixing the position of a section of said upper apron defining endless belt means.

4. The transporter device of claim 1 wherein said driving means includes endless chain means operatively secured to said support means for extending and retracting the support means relative to said base portion of the device, and including a motor means and drive train means for operating said endless chain means in response to control signals dictated by an operator of the device.

5. The transporter device of claim 1 wherein a lowermost section of said lower apron defining endless belt means is permanently secured to the base portion of the device by said last-named means for fixing, and including means for selectively driving or fixing the position of a section of said upper apron defining endless belt means relative to said base portion.

6. The transporter device of claim 1 wherein said driving means for said upper and lower support means can be controlled separately from said means for selectively driving or fixing the position of said upper apron defining endless belt means.

7. The transporter device of claim 1 and including means for lifting and lowering said upper and lower aprons relative to the base portion of said device.

8. The transporter device of claim 1 wherein said upper and lower support means for said upper and lower aprons each comprise a nonrigid, flat member contained completely within the confines of an associated endless belt means except for protruding portions which secure the support means to said driving means.

9. The transporter device of claim 1 wherein said upper and lower support means are each in the form of a separating and supporting member having a plurality of discrete finger elements directed toward a leading edge of an associated apron so that the aprons can flex along their length to conform to the shape of a patient or other irregularly shaped object.

10. The transporter device of claim 1 wherein said upper apron defining endless belt means is of such a dimension and configuration as to substantially cover an upper surface of said device even when the upper support means has extended the upper apron to its most extended position relative to the base frame of the transporter device.

11. The transporter device of claim 1 wherein said endless belt means are formed from or coated with a low friction material.

12. The transporter device of claim 1 wherein the leading edge of said upper apron is inclined downwardly slightly to facilitate loading and unloading of an object relative to said upper apron.

13. A method of moving an object through a generally horizontal path of movement, comprising the steps of:
   positioning a transfer device adjacent a surface to or from which the object is to be moved, said transfer device having upper and lower aprons superposed one above the outher with separate, non-rigid support means being enclosed within each apron and with said lower apron having a portion fixed relative to a base structure of said transfer device,
   simultaneously extending the support means of the upper and lower aprons in generally horizontal planes toward said surface so as to rotate the leading edges of said upper and lower aprons in opposite directions, said extending step having the function of either (a) placing an object carried on the uppermost face of said upper apron over said surface onto which the object is to be deposited or (b) receiving an object from said surface by the movement of both aprons underneath the object without any relative movement between apron faces and the object and the surface on which the object is resting, and
   retracting the upper and lower aprons in such a way as to move a received object back to a position over said transfer device or to deposit on said surface an object which has been placed over the surface.

14. The method of claim 13 wherein said retracting step includes a step of moving the uppermost face of said upper apron relative to the support means of said upper apron so that an object which has been received on said uppermost face is re-positioned on said upper apron before the support means of the upper apron is retracted toward the transfer device.

15. A mehod for changing a sheet under a patient on a bed with a transfer device of the type having upper and lower aprons superposed one above the other with separate, non-rigid support means being enclosed within each apron and with said lower apron having a portion fixed relative to a base structure of the transfer device, the steps comprising:
- fitting a first longitudinal edge of a fresh sheet between leading edges of the upper and lower aprons, and pushing the remainder of the sheet body back between the endless belts, leaving only a second longitudinal edge exposed and turned back over the leading edge of the upper apron,
- simultaneously extending the support means of said upper and lower aprons in generally horizontal planes over a bed surface and under a patient with no relative movement between contacting surfaces of the two endless aprons, and continuing the extending step until the first longitudinal edge of the sheet has been advanced from between the two aprons to a far side of the bed over which the aprons have been moving, and the second longitudinal edge of the sheet remaining over the uppermost face of the upper apron in a position along a near side of the bed over which the aprons have moved,
- lifting the first and second longitudinal edges of the sheet upwardly temporarily so that the aprons can be retracted,
- securing a longitudinal edge of a sheet to be removed from the bed in gripping relationship between the leading edges of the upper and lower aprons, and
- retracting said upper and lower aprons to withdraw said sheet to be removed from beneath the patient.

16. Apparatus for transferring an object from a surface on which the object rests, said apparatus comprising:
- means defining a load carrying base structure to which the object is to be transferred;
- flexible support means movable between a first position on said base structure and a second position over said surface and under the object resting thereon, said flexible support means deforming as necessary to conform to said surface during such movement under the object, irrespective of the contour of said surface; and
- means adjustable to (a) a first condition to eliminate transmission of lateral forces between said flexible support means and the object during movement of the flexible support means to said second position beneath the object resting on said surface and (b) a second condition to maintain the object on said flexible support means during translating movement thereof from said second position to said first position, whereby the object can be loaded on said flexible support means and transferred from said surface.

17. Apparatus for transferring patients from diversely contoured surfaces, said apparatus comprising:
- means defining a load carrying base structure to which the patient is to be transferred;
- flexible support means movable between a retracted position over said base structure and an extended position over a surface and under the body of a patient resting thereon, said flexible support means deforming as necessary to conform with the contour of said surface during such movement under the body of the patient;
- means adjustable to (a) a first condition to eliminate the transmission of lateral forces between said flexible support means and the patient's body during movement of the flexible support means to said extended position beneath the patient's body resting on said surface and (b) a second condition to maintain the patient's body on said flexible support means during translating movement thereof from said extended position to said retracted position, whereby the patient can be loaded on said flexible support means and transferred from said surface to said base structure; and
- means to translate said support means between said retracted and extended positions while said adjustable means is maintained respectively in said first and second conditions.

18. The apparatus recited in claim 17 wherein said flexible support means comprises at least one thin sheet-like member having top, bottom and leading end surfaces and wherein said adjustable means comprises an apron of flexible web material trained about said top, bottom and leading end surfaces of said support means.

19. The apparatus recited in claim 18 comprising further:
- means to insulate the portion of said apron trained along the bottom edge of said sheet-like member from direct contact with the surface on which the patient is resting during translating movement of said member between said retracted and extended positions.

20. The apparatus recited in claim 18 wherein said thin sheet-like member comprises a plurality of discrete finger elements directed towards the leading edge thereof.

21. The apparatus recited in claim 17 wherein said flexible support means comprises upper and lower superposed flexible sheet-like members each having top and bottom surfaces terminating at leading and trailing ends and wherein said adjustable means comprises an upper apron trained about the top, bottom and leading end surfaces of said upper sheet-like member;
- means for holding the portion of said upper apron trained on said top surface of said upper member against movement with said upper member to establish said first condition and to move said upper apron portion with said upper member to establish said second condition; and
- a lower apron trained about the top, bottom and end surfaces of said lower support member, said lower apron being rotatable about said lower support.

22. The apparatus recited in claim 21 including means to fix a lower portion of said lower apron against movement relative to said base structure.

23. The apparatus recited in claim 21 comprising a pair of endless belts to establish said upper and lower aprons.

24. Apparatus for transferring objects from an initial surface on which the object rests to an object carrying structure, said apparatus comprising:
- means to establish an upwardly facing, generally horizontal deck having inner and outer edges;
- upper and lower support means each having top and bottom surfaces terminating at leading and following edges, said support means being carried by said deck for movement between a retracted position on said deck and an extended position in which the leading edge of said support means projects from the outer edge of said deck to and along said initial surface;
- means forming upper and lower aprons trained about the top, bottom and leading edge surfaces of said upper and lower support means, respectively, thereby to establish generally parallel upper and lower flights in each of said upper and lower aprons;
- means to move said support means between said retracted position and said extended position;
- means storing said means forming said upper apron when said support means are retracted whereby the upper flight thereof can be extended between the inner edge of said deck and the leading edge of said upper support means when the latter is in said extended position; and
- means to regulate movement of the upper flight of said upper apron independently of said support means so that is remains stationary relative to said deck during movement of said support means to said extended position under an object to be transferred and so that it may be moved with said support means and relative to said deck during retraction of said support means to transfer an object to said deck.

25. The apparatus recited in claim 24 wherein said means forming said upper and lower aprons includes first and second endless belts, respectively.

26. The apparatus recited in claim 25 wherein said means storing said means forming said upper apron comprises a loop in said first endless belt trained about the top, bottom and trailing flight portions of said second endless belt.

27. The apparatus recited in claim 24 including maens to restrain the lower flight of said lower apron against movement with respect to said deck during all such movement of said support means.

28. Apparatus for transferring an object from an initial surface on which the object rests, said apparatus comprising:
   means defining a load carrying structure to which the object is to be transferred;
   upper and lower support means each having top and bottom surfaces terminating at leading and following edges, said support means being carried by said structure for movement between a retracted position and an extended position in which said support means are positioned beneath the object and on said initial surface;
   endless belt means forming upper and lower aprons trained about the top, bottom and leading edges surfaces of said upper and lower support means respectively, thereby to define generally parallel first, second, third and fourth apron flights, said first and second flights being established by portions of the upper apron on the top and bottom surfaces respectively of said upper support means, said second and third flights being in direct contact with each other, the portion of said upper apron defining said second flight extending about the rear edge of said lower support and under said fourth flight to establish a fifth flight; and
   means to move said support means to said extended position while said first and fourth apron flights are restrained against movement to insulate said object and said initial surface from sliding contact with said support means, said second and fifth flights providing a loop of belt material whereby movement of said support means from said retracted position to said extended position while said first flight portion of said upper apron is held against movement effects a diminution of said loop to supply the increased length of said upper flight needed to accommodate such movement of said support means.

References Cited
UNITED STATES PATENTS

| | | | |
|---|---|---|---|
| 2,528,048 | 10/1950 | Gilleland | 5—86 |
| 2,733,452 | 2/1956 | Tanney | 5—81B |
| 3,418,670 | 12/1968 | Morgan | 5—86 |
| 3,493,979 | 2/1970 | Koll et al. | 5—81R |

CASMIR A. NUNBERG, Primary Examiner

U.S. Cl. X.R.

5—86; 214—83.24, 730